July 13, 1948.  H. C. HIGGINS  2,444,932
MEANS FOR ACTUATING AIRCRAFT LANDING
GEAR BY FORCE OF SLIPSTREAM
Filed Sept. 6, 1945  4 Sheets-Sheet 1

INVENTOR.
HARRY C. HIGGINS
BY
*Wade Koontz*
*J. Daniel Stuwe*
ATTORNEYS

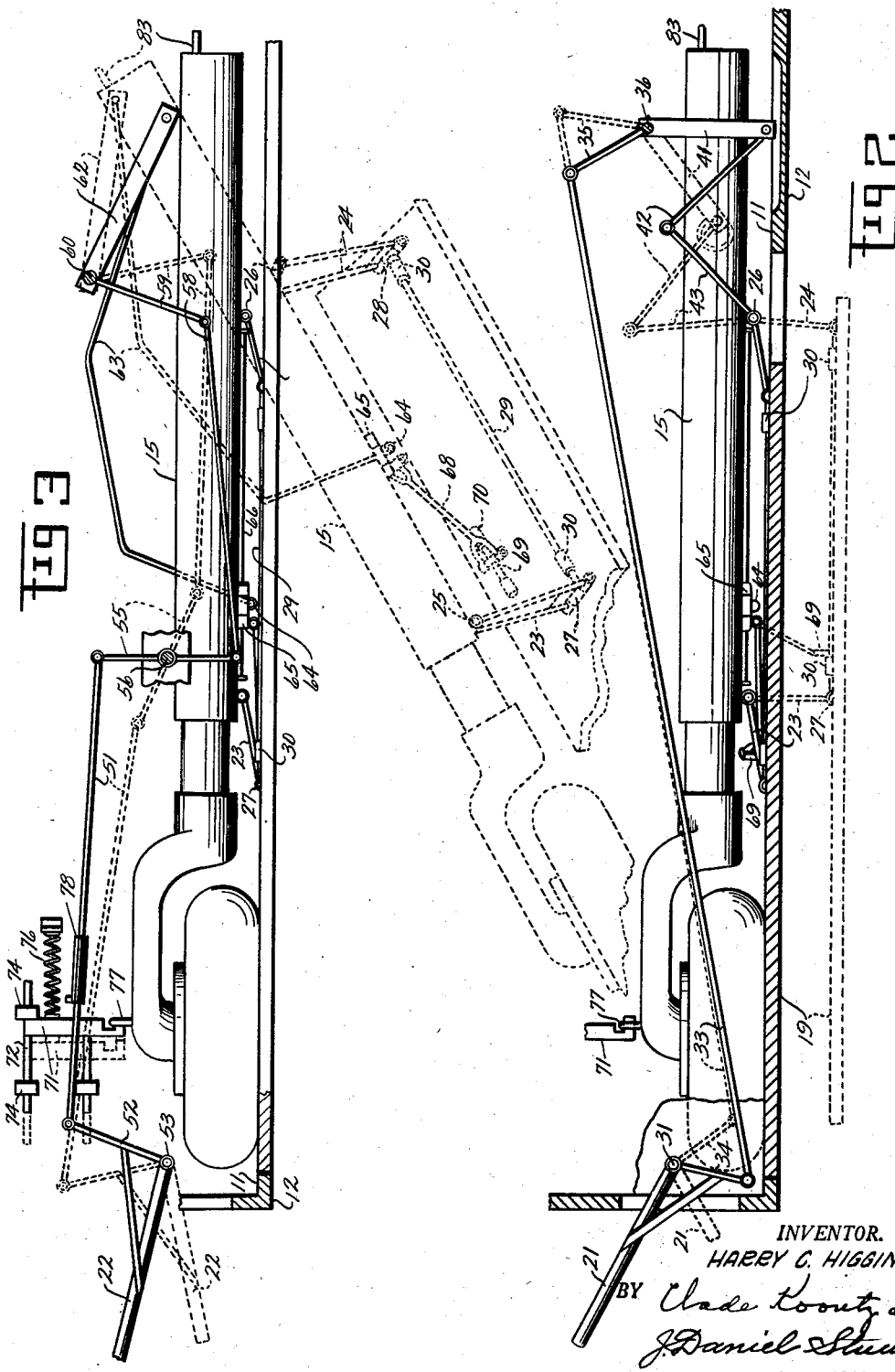

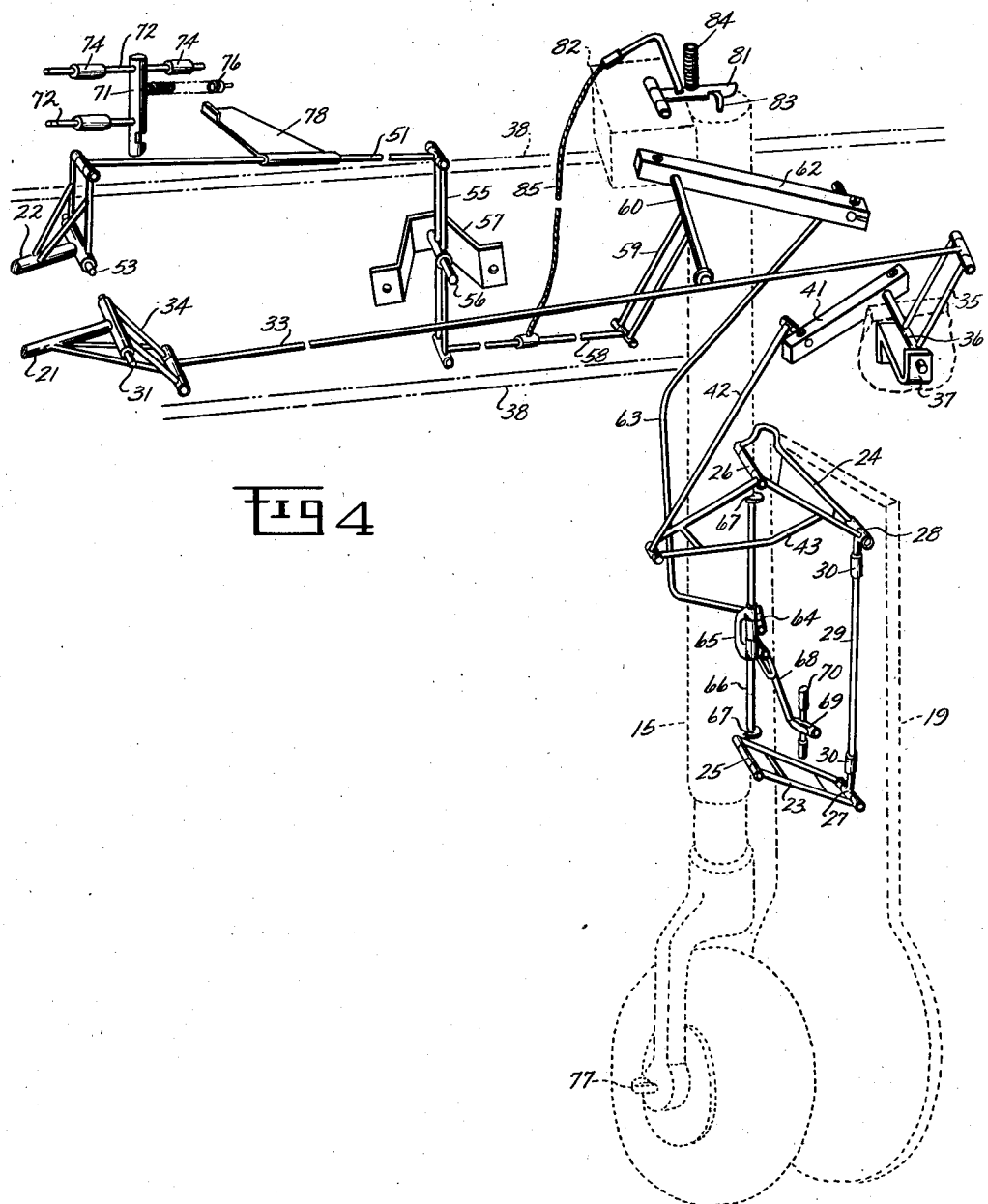

July 13, 1948.  H. C. HIGGINS  2,444,932
MEANS FOR ACTUATING AIRCRAFT LANDING GEAR BY FORCE OF SLIPSTREAM
Filed Sept. 6, 1945  4 Sheets-Sheet 4
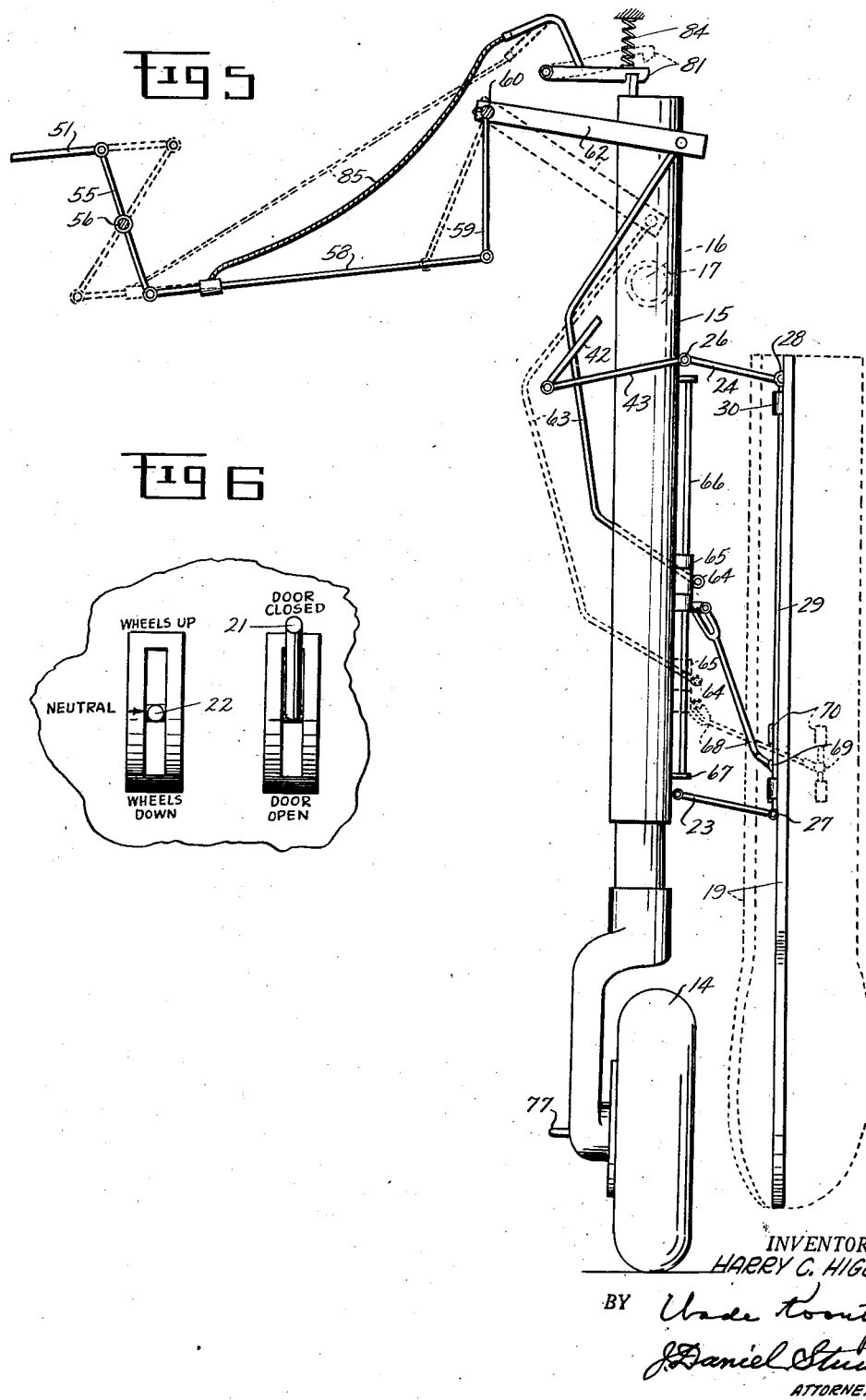
INVENTOR.
HARRY C. HIGGINS
BY
ATTORNEYS Patented July 13, 1948

2,444,932

UNITED STATES PATENT OFFICE 2,444,932

MEANS FOR ACTUATING AIRCRAFT LANDING GEAR BY FORCE OF SLIPSTREAM

Harry C. Higgins, Santa Monica, Calif.

Application September 6, 1945, Serial No. 614,799

12 Claims. (Cl. 244—102)

(Granted under the act of March 3, 1883, as amended April 30, 1928; 370 O. G. 757)

The invention described herein may be manufactured and used by or for the Government for governmental purposes without payment to me of any royalty thereon.

This invention relates to improved mechanism arranged and operable to utilize the force of the slipstream for extending and retracting the landing gear of an aircraft.

An essential object of this invention is to provide mechanism whereby the door or closure member of the landing gear well on aircraft may be utilized and connected to the strut of the landing gear in such a manner that it can be readily tilted to the line of flight so as to employ the force of the air current or slipstream as a motive power for extending and for retracting the landing gear.

Another object of this invention is to provide such a mechanism for utilizing the slipstream to operate the landing gear, wherein the mechanism is so arranged and constructed as to be relatively light and will thus accomplish a saving of weight over the conventional installation comprising hydraulic pumps, pistons, tubings, etc., and which, due to its light weight, may moreover be readily arranged and adapted to be used in conjunction with the existing conventional installation.

These and various other objects and advantages are attained with this invention, as will become apparent from the following description, taken in connection with the accompanying drawings illustrating the invention in its preferred form, it being evident that other arrangements and forms of construction may be resorted to in carrying out the objects and purposes of this invention.

In the drawings:

Fig. 2 is a front elevational view of the landing gear together with the door shifting lever and linkage in the retracted position in the wing well shown in section, also showing in dotted outline the door initially released by movement of this lever.

Fig. 3 is a front elevational view of the landing gear and door along with the door tilting and gear locking lever and linkage, shown in the retracted position, also showing in dotted outline the uplock released and the door with the gear descending, having the door initially tilted for downward thrust.

Fig. 4 is a perspective view of the two control levers and associated linkages, shown as placed when the landing gear is locked in the extended position.

Fig. 5 is a front elevational view showing the landing gear with the door and the door tilting linkage locked in the extended position, also showing in dotted outline the locking means released and the door tilted to start on its upward swing.

Fig. 6 is an elevational view indicating two levers mounted to be operable by the pilot, one for releasing the closed door and for shifting it longitudinally of the landing gear strut, and the other for tilting the door on said strut and for releasing the uplock and downlock of the landing gear.

Figure 1:
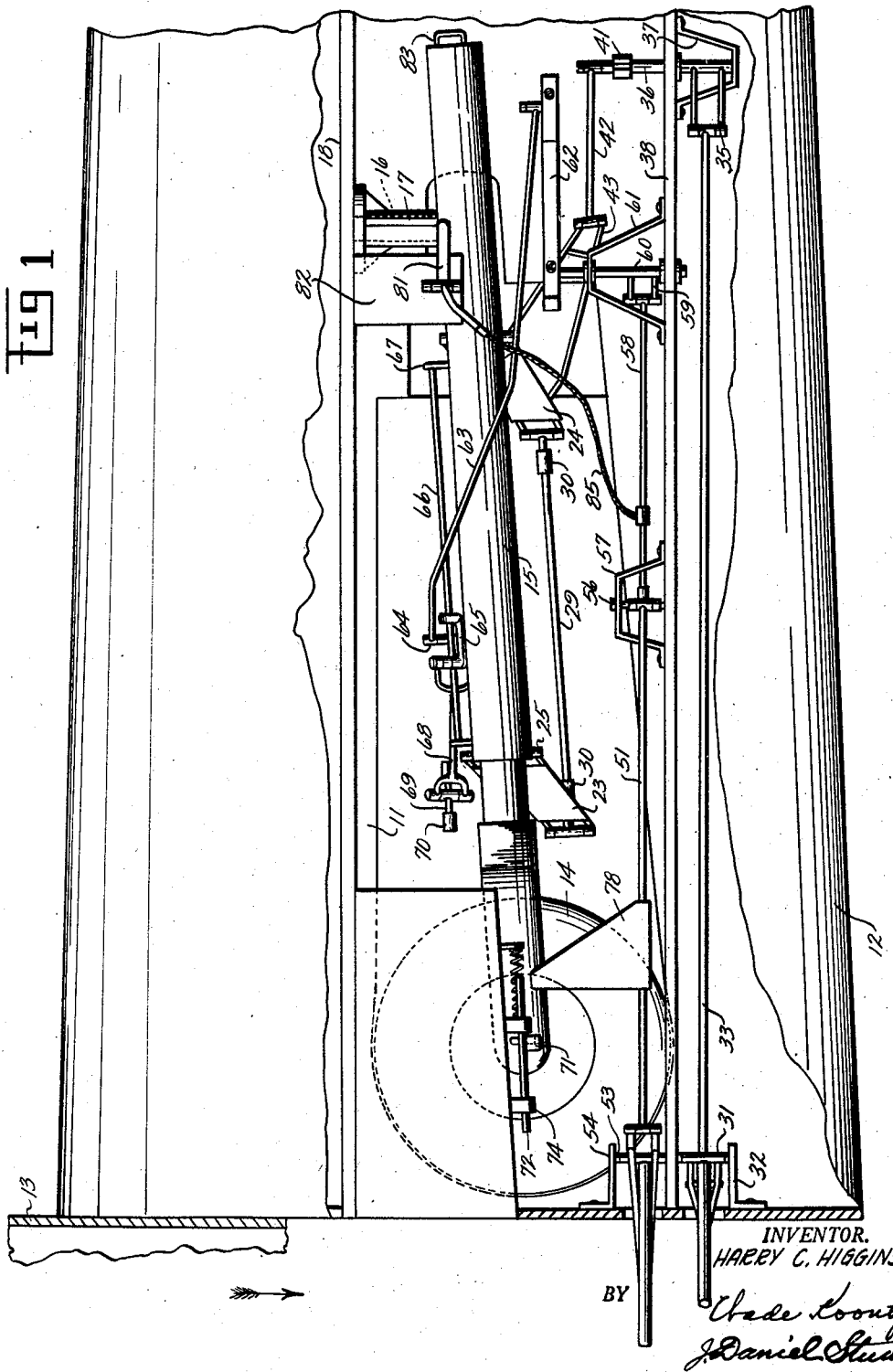
Fig. 1 is a plan view of the retracted landing gear in the housing or well provided in the airplane wing and having my invention applied thereto.

The drawings illustrate an embodiment of my invention in a preferred form and as being utilized for actuating the landing gear of the type that is swingable or retractable in a plane extending normal to the line of flight. In this form, as shown herein, the landing gear 10 is retractable into a recess or housing 11 known as the landing gear well, and this is provided in the wing 12 which extends laterally from one side of the fuselage 13 of the aircraft. This landing gear comprises a landing wheel 14 which is mounted on the lower end of a strut 15, the strut being pivotally mounted adjacent its upper end by a side stem 16 which is rotary in a sleeve 17 extending from a bar 18 of the wing and which stem extends parallel to the line of flight, indicated by the arrow in Fig. 1, so that the strut and the wheel will swing in a plane normal to said line of flight.

The landing gear well as a rule has a door provided for closing the well, and in the present invention such landing gear door 19 is used as the airfoil or air actuated means which utilizes the force of the slipstream for extending and retracting the landing gear 10. The door is substantially in the shape of a panel and is of proper size for the required purpose, and hereby I obviate the use of additional air actuated means or of adding extra weight to the aircraft.

Two sets of levers and linkages are provided for connecting the door 19 with the landing gear strut 15, so as to be movable therewith and also relative thereto. These two sets include the two operating levers 21 and 22, which are positioned to be operable by the pilot of the aircraft. The lever 21 and its associated linkage is used to shift the door upwardly on the strut, in order to space the door above the bottom of the wheel when the latter descends to the ground in landing, and the lever 22 with its associated linkage is used for tilting the door on the strut whereby to utilize the slipstream for retracting and extending the landing gear and also to simultaneously unlock the landing gear when locked respectively in either its extended or its retracted position. Although only one wing with one landing gear well and landing gear with operating mechanism is shown in this case, it is readily apparent that the other wing is similarly equipped.

Referring especially to Fig. 2 of the drawings, the door 19 is swingably connected to the landing gear by two pairs of links 23 and 24 which are pivoted at one end to the strut 15 by means 25 and 26, respectively, and at the other end by knuckles 27 and 28, which are connected by a rod 29 that is rotary in eyes 30 secured on the door 19 adjacent the forward edge of the door. Said links provide a hinge connection and the door is also tiltable on said rod 29 at its forward part. These links 23 and 24 are furthermore so arranged that as the door initially descends from its well-closing position, while the strut is still locked in the wing, the door will automatically move outboard of the wing or in a direction longitudinally upwardly of the strut, as shown in dotted outline in Fig. 2, so that the door is hereby spaced away from the bottom part of the wheel when that descends to the ground.

The door is released by actuating the lever 21, and this lever is shown herein in the form of a bell crank mounted pivotally by a shaft 31 in a bracket 32 secured in the airplane, the lever being mounted in a position to be within reach of the pilot. A link 33 extends from an arm 34 of said lever to an arm 35 secured on a shaft 36 which is rotary in a bracket 37 on the forward side of a bar 38 of the wing. A lever 41 depends from shaft 36 and from its lower end extends a link 42 to the swingable outer end of a lever 43 which has its inner end rigidly secured to the link 24.

It may be observed from Fig. 2 that by actuating lever 21 the door 19 can be initially moved from its well-closing position in the wing wall, where this door is flush with the adjoining exterior surface of the wing, downwardly into the slipstream, and will at the same time be automatically shifted longitudinally upwardly of the landing gear strut 15.

As shown more especially in Figs. 3 and 5, the lever and associated linkage for unlocking the landing gear 10 and for tilting the door 19 on the landing gear strut comprises the bell crank lever 22 and a link 51 pivoted at one end to an arm 52 of said lever which is swingable on a shaft 53 in a bracket 54, and said link has its outer end pivoted to the top end of a lever 55 which is pivotally supported by a shaft 56 in a bracket 57 on the bar 38. A link 58 extends from the lower end of lever 55 to a lever 59 secured on a shaft 60 pivoted in a bracket 61 secured on bar 38. A lever 62 has one end secured on shaft 60 and its free end has pivoted thereto a link 63 which is curved to operate freely around the strut 15 and has its lower end pivoted to a collar 64 which is positioned between the arms of a yoke 65, both said collar and said yoke being rotatable and also slidable on a rod 66 secured at its ends by spaced apart ears 67 to the strut 15. A link 68 extends from said yoke 65 to a member 69 which has end pins rotary in spaced cuffs 70 secured onto the door adjacent its rearward edge. Said link 68 functions as a door tilting link, so that movement of said collar 64 and yoke 65 along shaft 66 will vary the slant or tilt of said link 68 and thus vary the distance of cuffs 70 and of the rear edge of door 19 from strut 15, and thereby change the tilt of the door or airfoil for upthrust or for downthrust.

Locking means is provided herein, and it includes an uplock for locking the mechanism in its retracted position, and a downlock for locking the mechanism in its extended position, both being associated with and actuated by the lever 22. The uplock includes a latch 71 mounted on rods 72 which are slidably supported in sleeves 74 secured in the well 11. A spring 76 urges the latch to its closed position so as to hook into an eye 77 provided at the wheel end of the strut 15 to secure the strut in retracted or uplock position. A finger 78 is secured on link 51, in a position so that when lever 22 is depressed the finger will shift latch 71, against the action of spring 76, to release the eye 77 and enable the strut to initially drop out of the well.

The downlock includes a latch 81 pivoted on a bracket 82 on bar 18 so as to engage an eye 83 provided on the upper end of strut 15 and lock the strut in its extended position. A spring 84 urges the latch to its locking position, and a link 85 extends from rod 58 to said latch 81, so as to draw the latch 81 from the eye 83 by action of lever 22 and rod 58, against the action of said spring 84, and release the landing gear strut and wheel from its downlock or extended position.

Thereby, when lever 22 is actuated to tilt the door into downthrust position, then the uplock 71 is simultaneously released, and when the lever tilts the door into upthrust position, then the downlock 81 is thereby released.

In operating the mechanism, to release the landing gear from retracted or uplock position, the door actuating lever 21 is moved from the full-line position to the dotted-line position shown in Fig. 2, whereupon the door 15 descends from its closed position into the slipstream. The linkage is arranged so that the door by said descent is automatically shifted outboard of the wing, that is relatively longitudinally upwardly of the strut 15.

The door-tilting and lock-releasing lever 22 is next operated, as best shown in Fig. 3, from the full-line to the dotted-line position, thereby releasing the uplocked latch 71 by action of finger 78, enabling the landing gear with the door extended therefrom to drop from the wing well, which is effected by the force of gravity and also by the action of the slipstream upon the door 19, since the linkage is so arranged that the actuation of lever 22, in releasing the uplock latch 71 from the retracted strut will simultaneously tilt door 15 into its downthrust position. The force of the slipstream will be effective during this descent of the landing gear with its tilted door to force the landing gear fully into its extended position, as indicated in Figs. 4 and 5, whereby the downlock latch 81 will hook over eye 83 and lock the gear in its extended position. The door tilting lever 22 is then returned to its neutral position, which is the full-line position as shown in Figs. 3 and 6. However, if added drag is desired in the landing approach, then lever 22 and door 19 may be left in the downthrust and retarding position.

In order to retract the landing gear by the force of the slipstream, the lever 22 is moved to its upper or retracting position, therewith moving the associated linkage as shown in dotted outline in Fig. 5, so as to tilt the door 19 to the upthrust position, while simultaneously releasing the locking latch 81; consequently, the slipstream operating on the tilted gear well door 19 of the aircraft in flight will force the landing gear upwardly into its retracted position, whereupon the uplock latch 71 will engage the eye 77 and lock the strut in said well. The door 19 is still in the slipstream and still partially tilted, being subject to the force of the slipstream during the entire upthrust movement of the landing gear; and thereupon the lever 21 will be returned from its release position, shown in dotted lines in Fig. 2, to its closed position and close the door, as shown in full lines therein.

In using this mechanism on airplanes traveling at high airspeed, in order to avoid slamming and retard the rate of operation of the landing gear in the final part of its extending and retarding movement, a suitable dampening device may be installed. A hydraulic cylinder connected between the strut and the wing spar to control excessive rate of movement is well suited for that purpose.

It should be noted that in this construction, the landing gear well door itself is used as the airfoil, and thus no additional panel or plane or heavy member is added to the usual structure of the aircraft; and also that the levers and linkages for connecting the door to the strut and for operating the mechanism are relatively light, and very little weight is added to the aircraft thereby. This improved mechanism will therefore effect a substantial reduction in weight when it is installed in place of the customary means heretofore employed for operating the aircraft landing gear.

I claim:

1. In an aircraft having a wing provided with a well and having a landing gear swingable in a plane normal to the line of flight for retraction into said well, the improvement which comprises panel-shaped means mounted on the landing gear to extend longitudinally along the side thereof and to move therewith and be movable relative thereto, said means being of a shape and so located as to close the well when the gear is in retracted position, and means operable to tilt said means on said gear whereby to utilize the force of the slipstream for moving said landing gear into said well.

2. In an aircraft having a landing gear including a strut and a wheel swingable into and out of the retracted position, the improvement which comprises a panel and means hingedly mounting it on the strut, being spaced alongside of said strut to move therewith and to be shiftable longitudinally and tiltable laterally thereon, means operable to shift said panel longitudinally upwardly on the strut to clear the ground upon landing, and means operable to tilt said panel on the strut so as to function in utilizing the force of the slipstream for moving said landing gear in the desired direction.

3. In an aircraft having a retractable landing gear and a well wherein to inclose said gear, the improvement which comprises closure means for said well, said means when closed being flush with the exterior surface of the airplane adjacent the well, means supporting the closure means on the landing gear to move along therewith and to be movable relative thereto, and means operable for tilting the closure means on the landing gear to utilize the force of the slipstream in retracting said gear.

4. In an aircraft having a retractable landing gear and a well wherein to inclose said gear, the improvement which comprises closure means for said well, said means when closed being flush with the exterior surface around the well, means connecting the closure means with the landing gear to move along therewith and to be movable relative thereto, means operable for tilting said closure means on said landing gear to utilize the force of the slipstream in retracting said landing gear, said connecting means leaving said closure means depending tilted in the slipstream and subject to its force until the landing gear has been fully retracted, and means operable for thereafter raising said depending closure means into well-closing position.

5. In an aircraft having a landing gear retractable in a plane normal to the line of flight and having a well wherein to retract said gear, the improvement which comprises a door for said well and means connecting said door with the landing gear to be movable therewith and also relative thereto, means operable for causing said door to descend from the retracted landing gear into the slipstream and for shifting said door longitudinally of said gear to space the door above the ground upon landing, and means operable for tilting the door on said landing gear to utilize the force of the slipstream in extending and retracting said gear.

6. In an aircraft having a landing gear swingably retractable in a plane normal to the line of flight and having a well wherein to retract said gear, the improvement which comprises a door for said well and means for connecting said door with said landing gear to be movable therewith and also be shiftable longitudinally and tiltable laterally relative thereto, an uplock and a downlock for securing said gear in retracted and in extended position, respectively, means operable for moving said door longitudinally of said gear and for raising the door from the slipstream to close it after said gear is retracted, and means operable for tilting the door on said landing gear and simultaneously release the respective lock, whereby to utilize the force of the slipstream for swinging said gear.

7. In an aircraft having a retractable landing gear and also a well wherein to retract said gear, the improvement which comprises a door for closing said well, means connecting said door with said gear to extend longitudinally thereof and be movable therewith and also relative thereto, means operable for releasing the closed door and at the same time moving it longitudinally of the gear to have the door spaced above the ground when landing, means operable for tilting the door on said gear to utilize the slipstream in extending and retracting the landing gear, and means automatically locking said gear in retracted position, said locking means being releasable by said door tilting means, whereby with the tilting of the door for downthrust said locking means is also simultaneously released.

8. In an aircraft having a retractable landing gear and also a well wherein to retract said gear, the improvement which comprises a door for said well, means hingedly supporting the door on the landing gear to extend longitudinally thereof and be movable therewith and also relative thereto, means operable for moving said door longitudinally of said gear, an uplock and a downlock for locking said gear in retracted and in extended position, respectively, and means operable for tilting the door on said landing gear and simultaneously releasing the uplock while effecting a downthrust and likewise releasing the downlock while effecting an upthrust on the landing gear by the force of the slipstream.

9. In an aircraft having a retractable landing gear including a strut, the improvement which comprises an airfoil, link means mounting said airfoil hingedly on said strut to extend longitudinally thereof and substantially parallel thereto and to be shiftable and also tiltable on the strut, means operable for shifting said airfoil on the strut to have the airfoil spaced above the ground when said gear is extended, an uplock and a downlock for securing said gear in retracted and in extended position, respectively, means operable for tilting the airfoil on the landing gear to utilize the slipstream in raising and in lowering said gear, and means connecting said uplock and said downlock with the airfoil tilting means, whereby the airfoil is being tilted into its downthrust position while releasing the uplock and is also tilted into its upthrust position while releasing the downlock.

10. In an aircraft having a landing gear including a wheel and a strut being retractable in a plane normal to the line of flight and having a well wherein to retract said gear, the improvement which comprises a door for closing said well, link means hingedly mounting said door on said strut to be shiftable longitudinally of the strut and to be tiltable thereon, means operable for moving the door from the well into the slipstream and also shifting the door longitudinally of the strut to have it spaced above the ground when landing, an uplock and a downlock for locking the landing gear in extended and in retracted position, respectively, means including a tilting link between the door and the strut operable for tilting the door on the strut to utilize the force of the slipstream in extending and in retracting the landing gear, and means operably connecting both the uplock and the downlock to said door tilting means, whereby the release of the uplock also tilts the door for the downthrust and the release of the downlock also tilts the door for the upthrust.

11. In an aircraft having a landing gear including a strut swingably retractable in a plane normal to the line of flight and having a well whereinto retract said gear, the improvement which comprises a door for closing said well, spaced link means swingably mounting said door on said strut to extend substantially parallel to the strut and be shiftable longitudinally thereof, manually actuated means operably connected with said link means for moving said door from closed position into the slipstream and also move it longitudinally of the retracted strut to have the door spaced above the ground when landing, said link means including pivot means whereon to tilt the door, and manually actuated means including a lever and linkage and also tilting means between said door and strut and connected with said linkage for tilting the door on said pivot means to utilize the force of the slipstream in swinging the landing gear in the desired direction.

12. In an aircraft having a landing gear including a strut and a wheel thereon being retractable in a plane normal to the line of flight and having a well wherein to retract said gear, the improvement which comprises a door for closing said well, means supportingly connecting said door with said strut to be movable longitudinally of said strut and to be tiltable thereon, lever and linkage means associated with said connecting means and being operable during extending movement to move the door from closed position into the slipstream and at the same time shift the door longitudinally upwardly of the strut, whereby during retracting movement the door depends tilted in the slipstream until the landing gear is fully retracted, the door being closable by operation of said lever, an uplock and a downlock for locking the landing gear in extended and in retracted position, respectively, means operable for tilting the door on the strut to utilize the force of the slipstream in extending and in retracting the landing gear, and means operably connecting both the uplock and the downlock to said door tilting means, whereby tilting of the door for the downthrust releases the uplock and tilting of the door for the upthrust releases the downlock.

HARRY C. HIGGINS.

REFERENCES CITED

The following references are of record in the file of this patent:

UNITED STATES PATENTS

| Number | Name | Date |
|---|---|---|
| 1,418,008 | Martin | May 30, 1922 |